INVENTORS
CLEVE R. LECKEY
RICHARD J. QUINT
RICHARD L. BLANCHARD
BY
ATTORNEYS

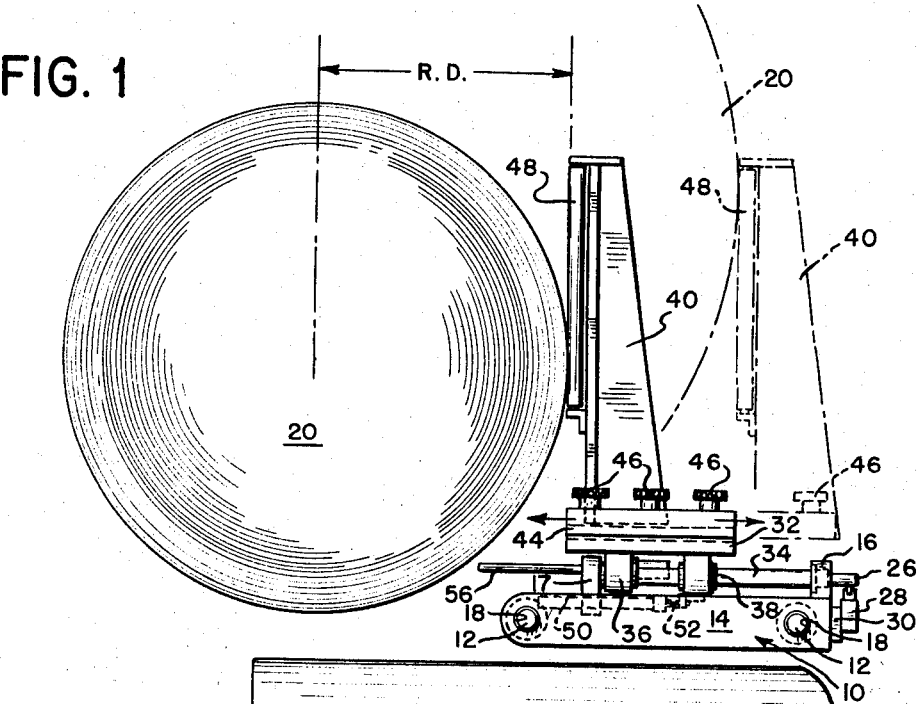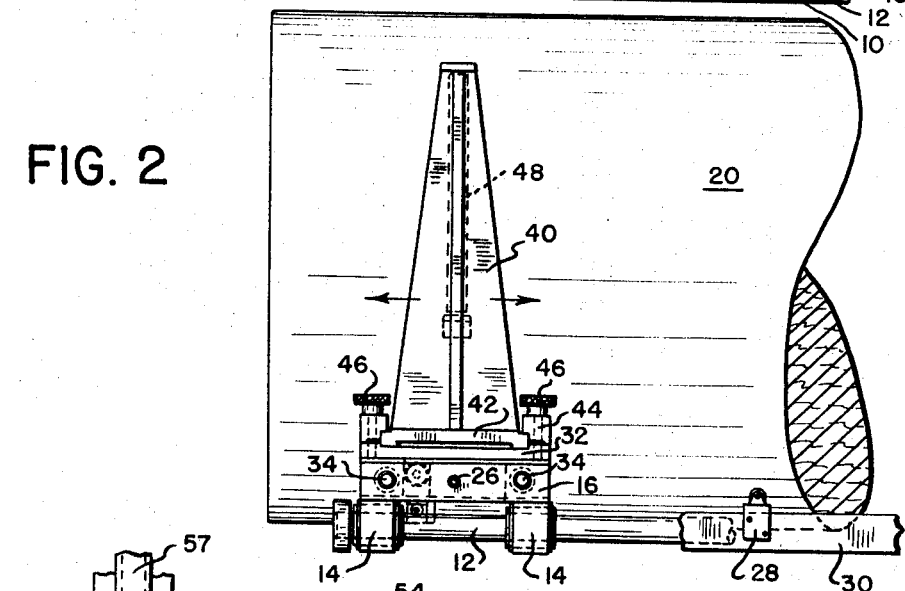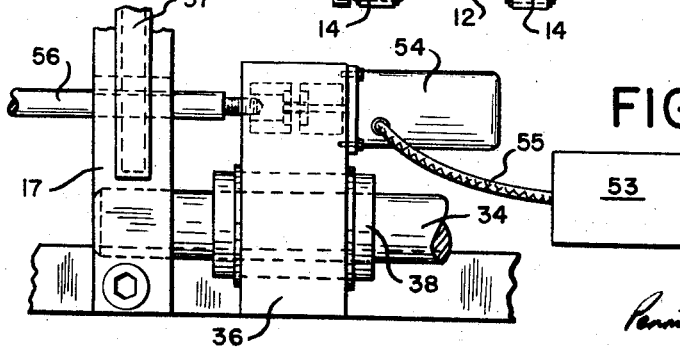

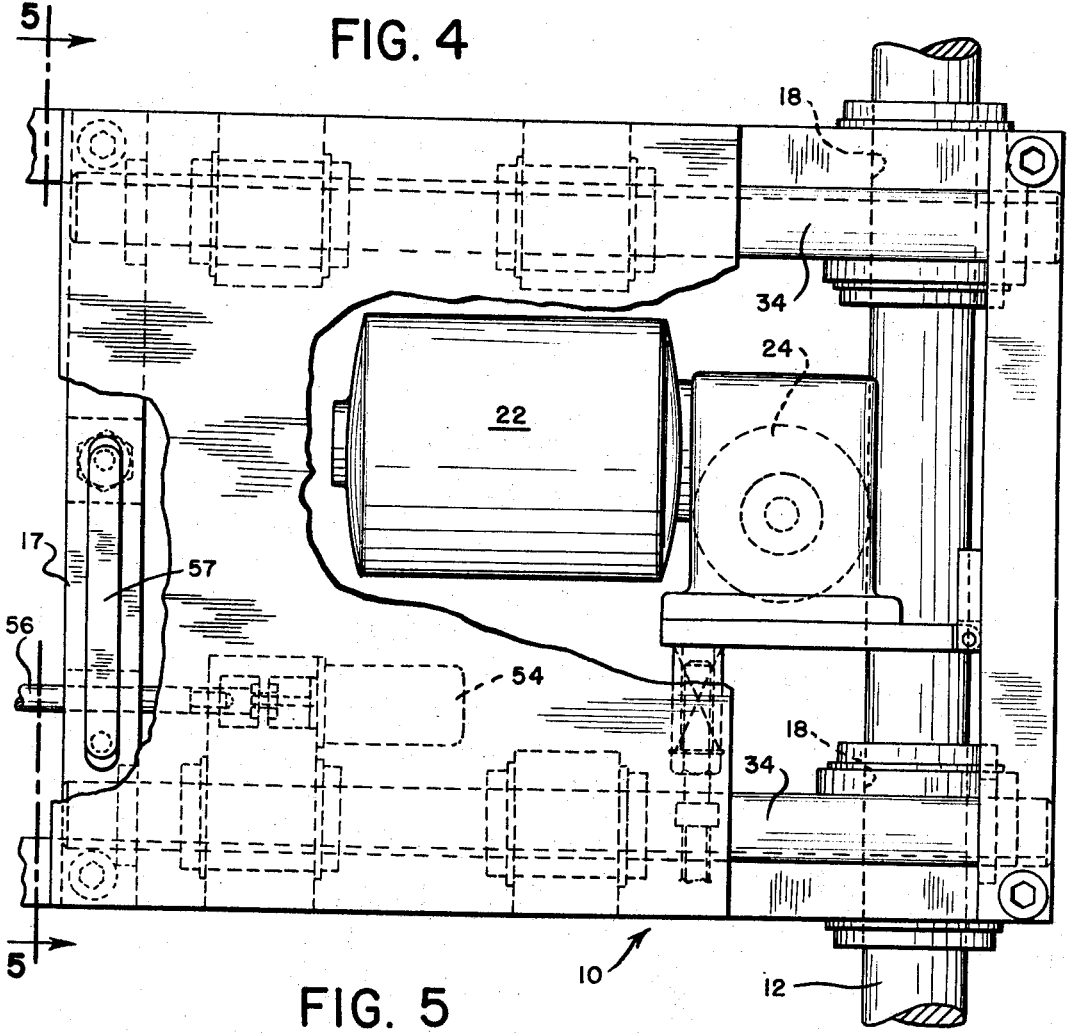
FIG. 4
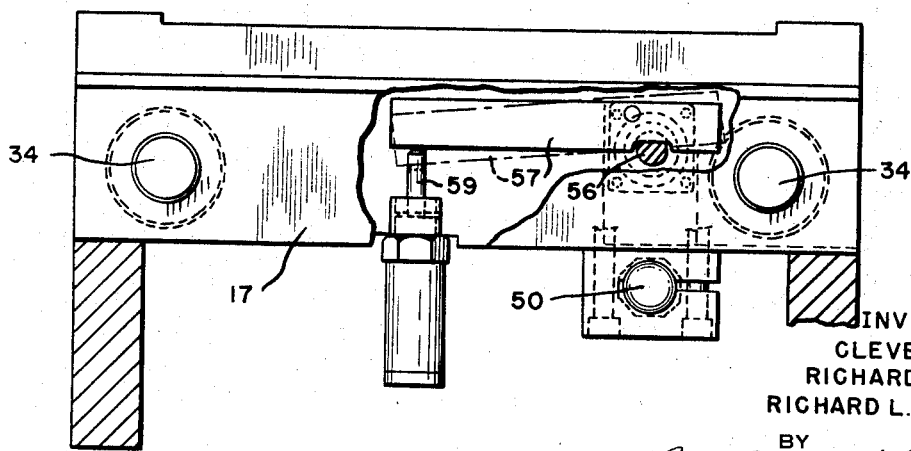
FIG. 5
INVENTORS
CLEVE R. LECKEY
RICHARD J. QUINT
RICHARD L. BLANCHARD
BY
ATTORNEYS

3,427,723
ROLL PROFILER

Cleve R. Leckey, West Peru, and Richard J. Quint and Richard L. Blanchard, Dixfield, Maine, assignors to Oxford Paper Company, Rumford, Maine
Application Sept. 23, 1964, Ser. No. 398,491, which is a continuation-in-part of application Ser. No. 313,342, Oct. 2, 1963. Divided and this application May 26, 1967, Ser. No. 660,846
U.S. Cl. 33—174     2 Claims
Int. Cl. G01b 5/08

---

ABSTRACT OF THE DISCLOSURE

A roll profiler for measuring the differential stretch in a web of material wound into a roll comprising a support extending the length of the roll, a carriage slidably mounted on the support for movement along the length of the roll, sensing means attached to the carriage and engaging the diametrically opposite sides of the roll, means for moving the carriage along the length of the roll, and means for continuously recording the output signal of the sensing means as it moves along the length of the roll.

---

Application, Ser. No. 398,491, now abandoned, is a continuation-in-part of our application Ser. No. 313,342, filed Oct. 2, 1963, now abandoned.

This application is a divisional of pending application, Ser. No. 398,491 filed Sept. 23, 1964, now abandoned, and assigned to the same assignee as the present application.

The present invention relates to a method and apparatus for measuring imperfections in a web of material and more particularly to a method and corresponding apparatus for making such measurements after the material has been wound into a roll by sensing differential changes in the roll surface contour.

The present invention has particular usefulness in conjunction with paper manufacturing and coating apparatus for accurately measuring the differential caliper of the web material in a direction along its length and across its width and for determining the location of, and calibrating the differential stretch that may have been produced in such web material during its manufacture and subsequent coating and handling.

In the original production of paper, for example, or in the coating of paper, flaws or imperfections such as caliper variation may be caused for any of a number of reasons as improper alignment of roller stacks or improper alignment of sizing or coating equipment. With misalignment of such parts of paper manufacturing or processing apparatus, the paper web may be unevenly compressed between the rollers through which it passes or may be coated unevenly. Imperfections in the paper may also be caused by foreign material inadvertently finding its way into the apparatus and becoming incorporated in the produced web material or remaining in the apparatus and causing uneven wearing of critical parts.

After the paper web has been formed or after the web has been coated, as the case may be, it is the general practice to wind it upon a cylindrical core preparatory to further handling or subsequent use in printing presses and other web using apparatus. The winding of the web material onto a core may, however, produce further imperfections in the web. For example, uneven pulling of the paper as it is being wound will tend to cause stretching in localized areas. Such stretching may extend the full length of the paper web and as it is wound upon its core, become aggrevated or amplified due to the increasing size of the roll.

Also, stretching of the web material as it is wound into a roll may be caused by the original differential caliper produced during the previous manufacturing stages. For example, in those areas where the caliper of the web is greater than adjacent areas, a ridge or bulge will be produced in the wound roll. Assuming that this higher caliper extends the full length of the web, the bulge formed in the roll will extend completely around the periphery of the roll and as the size of the wound roll increases, the size of this bulge will likewise increase. This is apparent since the caliper of the individual layers is being multiplied as layer upon layer is formed in the roll.

As the size of the roll and the accompanying bulge is increased, the individual layers of the web will be caused to stretch. Such stretching will be produced in directions both transversely of the web and longitudinally thereof. Transverse stretching will result since the web with its width in the wound roll remaining substantially constant throughout its length will be required to follow a curved and consequently longer path in the area of the bulge. Longitudinal stretching, on the other hand, will be caused by the increased circumferential path that the web must follow in forming each wound layer.

Web material rolled in this condition, whether it be original paper stock, coated paper or the like, when subsequently unrolled in a suitable web using apparatus, as for example, a printing press, may obviously have an adverse affect on proper running of the web using apparatus and on the quality of the finished product. When the section of web that has been stretched is unwound from the roll, it will present a greater dimension across the surface of the web than another section of the web that has not been stretched or stretched to a lesser degree. This stretched portion will show as bagginess in the unwound web and if such bagginess is present to any great extent, will necessitate removal of the roll from the web using apparatus and replacement with a new roll. And at the same time, it is quite likely that the final product already produced with this imperfect web will have to be discarded.

In a printing press in which high quality printing is desired it is of course desirable that the web material fed to the press be perfectly uniform in all respects throughout its length. In actual practice, however, this is not economically feasible and instead tolerances are developed within which variations in the physical characteristics of the web material are deemed permissible. These tolerances vary for different types of web using apparatus and with the quality of the final product desired, but nevertheless, are available for determining whether a particular supply of web material is in fact usable.

Many attempts have been made in the past to measure imperfections in the web material as it is being manufactured or processed. Conventionally, these measurements are taken on a single thickness of web material of finite length and as such cannot give an accurate picture of the entire supply. Variations in the caliper of a particular section of web material before it is wound into a roll may be as small as 0.00001 inch. Variations of this magnitude are too small to be detected without employing highly sensitive and expensive equipment. Furthermore, a variation of this magnitude would itself most likely be within the limits of the strictest of tolerances required by any web using apparatus and its detection would therefore be of little value.

If a variation of this magnitude or one of even a higher magnitude is measured on a finite length of a single layer of web, it cannot be accurately or expediently determined whether such a variation is merely a localized one or that will extend the full length of the web. If it is of the former type, it will most likely have little if any adverse affect on the web during its subsequent feeding through the web using apparatus.

If, however, such a variation were to persist along the full length of the web, it would, as explained above, be amplified as the web was wound onto a core. For example, in a roll of paper having a diameter of 36 inches made up of 0.003 inch caliper stock, it will take some 12,000 layers of paper to complete the roll. With a constant caliper variation of 0.00001 inch existing in any one portion of the web, a bulge of $\frac{1}{16}$ inch will be caused in the outer profile of the roll. The web will have been stretched more and more as the winding progresses in order to compensate for the ever increasing bulge and with a 36 inch roll, such a bulge $\frac{1}{16}$ inch can be measured to have caused a nine foot web of paper to stretch $\frac{3}{16}$ inch. Web material of this nature will be unacceptable in quality printing operations, yet as far as the original measurement is concerned, it could not be determined that this would be the case since it was not known if this imperfection was going to be incorporated in the full length of the web.

Further aggravating any attempt to determine the acceptability of a wound supply of web material before it is wound are the forces acting on the inner layers of material as subsequent layers are wound into the mass. It is quite normal for a single sheet caliper to show variations as great as $\pm 0.0002$ inch. If this variation were present in a 0.003 inch caliper paper and were to remain constant in any one portion of the web as it is wound into a 60 inch diameter roll, the calculated ridge or bulge that should be produced in the profile of the roll would be two inches. Since, however, bulges of this magnitude do not exist in actual practice, it appears that there is an undetected averaging out of the caliper variation and this necessarily reduces the reliability of the original caliper measurement.

In view of the foregoing it can be seen that it is important for the quality control of completed paper rolls shipped to printers that a total picture be obtained of the full length of web wound on the roll. Because ridges, bulges or stretched portions can cause distortions and imbalanced conditions in the paper during printing, resulting in poor runability, it is imperative that a diagnostic tool of high accuracy be available to measure the condition of the paper and that standards be established correlating those measurements to paper roll runability.

The present invention overcomes the limitations of the prior art and provides a method and apparatus for accurately analyzing the condition of the paper web after it has been wound into a roll. Broadly, the method comprises the steps of sensing the differential caliper and stretch present in the wound web material by sensing variations in the position of the surface of the roll from a fixed reference line while the apparatus broadly comprises a movable carriage and means for supporting the carriage. The supporting means are adapted to permit the movement of the carriage along the length of the roll of web material and at a fixed reference distance from the axis of the roll. In addition, sensing means are supported by the carriage for sensing the differential imperfections in the web by measuring the differential surface contour of the wound roll of web.

A more concise understanding of the invention may be obtained from the following detailed description with reference being made to the accompanying drawings in which:

FIG. 1 is a side elevation of one embodiment of the present invention in operating position with respect to a paper roll;

FIG. 2 is a front elevation of the embodiment of FIG. 1;

FIG. 3 is a detail elevation illustrating the transducer assembly of the embodiment of FIG. 1;

FIG. 4 is a plan view of the carriage of the embodiment of FIG. 1 with a cut out section illustrating the drive assembly;

FIG. 5 is an end elevation of the carriage of FIG. 4 illustrating the locking means for the transducer rod;

Figure 6:
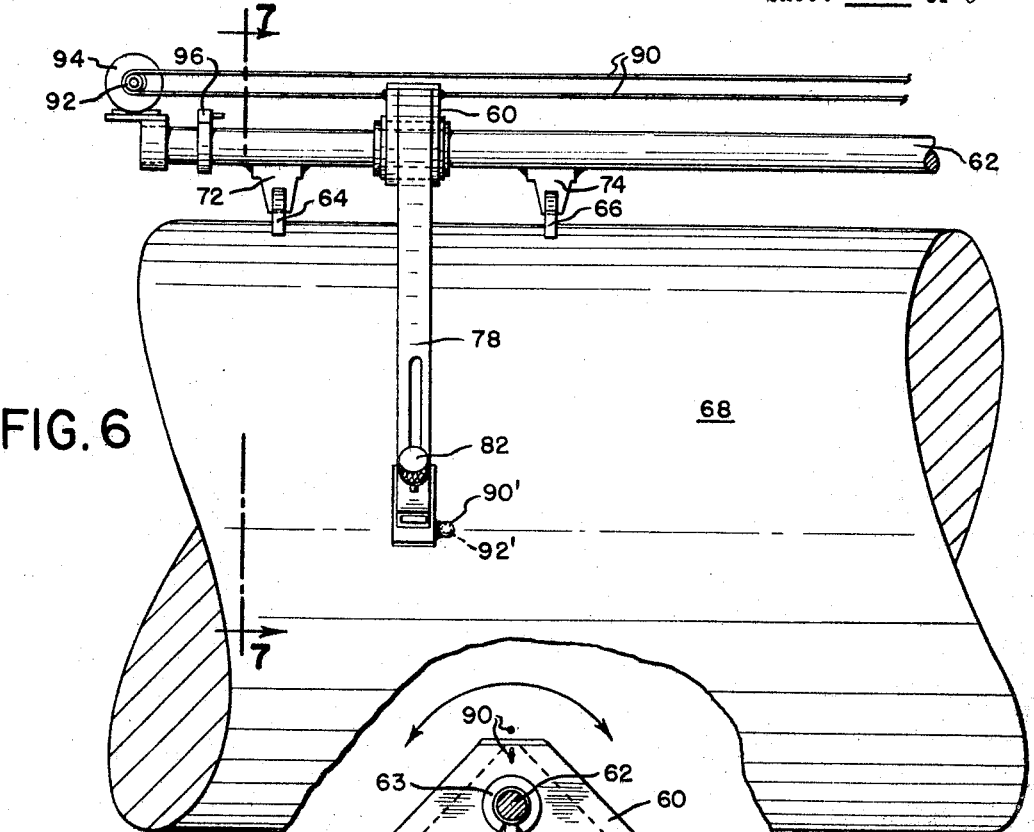
FIG. 6 is an elevation of another embodiment of the invention illustrating the carriage disposed above the paper roll.

Referring particularly to FIGS. 1 and 2, the measuring apparatus of the present invention, which for purposes of description may be termed a roll profiler, comprises a carriage 10 adapted to be moved longitudinally along shafts 12. The carriage 10 comprises a pair of frames 14 connected by cross pieces 16 and 17. The frames 14 are provided with openings 18 adapted to receive the shafts 12 in sliding engagement therein.

The shafts 12 are oriented such that their longitudinal axes are parallel to a vertical plane extending through the longitudinal axis of a paper roll 20 and extend substantially the entire length of the roll. The shafts 12 are maintained in parallel relationship to each other and to such plane by a support means (not shown).

The carriage 10 is moved along the shafts 12 by a drive means comprising a motor 22 and a drive wheel 24, best seen in FIG. 4. The motor 22 is supported by the carriage 10. The motor 22, which is preferably of the reversible type, turns the drive wheel 24, which by reason of its engagement with a shaft 12, moves the entire carriage 10.

For automatic operation the carriage 10 is provided with a trip rod 26 which is adapted to actuate a microswitch 28 located upon a bar 30 which bar is parallel to the shafts 12. The switch is operatively connected to the motor 24 and may be selectively placed at various positions along the bar 30. As the carriage 10 passes the switch 28, the trip rod 26 strikes the switch which causes the motor to reverse, thus returning the carriage to its starting position.

The carriage 10 is adapted to support a movable bed 32. A pair of rods 34 are secured between and interconnect the crosspieces 16. The rods 34 are parallel to each other and substantially perpendicular to the axis of the shafts 12 and thus perpendicular to a vertical plane extending through the axis of the paper roll 20. The movable bed 32 is movable upon the rods 34 by means of legs 36. The legs 36 are provided with bushings 38 which are adapted to receive the rods 34 therein in sliding engagement. Thus, the bed 32 may be moved inwardly and outwardly with respect to the paper roll 20.

A profile sensing roll bracket 40 is supported upon the movable bed 32. The bracket 40 is supported such that it may be selectively adjusted by movement in and out with respect to the paper roll 20 independently of the movement of the bed 32. In the preferred embodiment the bracket 40 is provided with a bottom plate 42 which is adapted to rest upon the movable bed 32. The bottom plate 42 is held securely upon the bed 32 by means of a clamping bar 44 provided with bolts 46. Thus, the operative position of the bracket 40 may be adjusted prior the use of the device.

As shown in FIGS. 1 and 2, the roll 20 is positioned with the ends of its axis, as defined by the ends of the roll, in a horizontal plane while the carriage is positioned to the side of the roll. Once the positioning of the bed 32 is made for a particular sized roll, a reference distance R.D. is established. This distance extends perpendicular to a vertical plane passing through the axis of the roll and with this construction, any bending or warping of the roll as may be caused by the weight of the roll along any unsupported portion of its axis, will have no affect on the already established reference distance R.D. This reference distance may therefore be used as a norm in measuring variations in the contour of the roll as will be more fully described below.

The bracket 40 supports a roll contour sensing roll 48 which is cylindrical in shape. This cylindrical shape and elongated configuration of the sensing roll 48 permits greater flexibility and use of the device with various sized paper rolls.

This flexibility is best illustrated in FIG. 1 where a larger paper roll is shown in phantom together with a representation of the moved position of the bed 32. The elongated shape of the sensing roll 48 insures that whatever the size of the paper roll or whatever vertical warp is produced by the unsupported portion of the roll, contact will be made between the sensing roll 48 and the paper roll 20 along a line that is unaffected by such variations in roll size or warp. It follows that as the sensing roll 48 is moved in a direction parallel to the vertical plane extending through the longitudinal axis of the paper roll 20, its successive points of contact with the roll will define a line representing variations in the surface contour of the wound web and thus changes in the web caliper or stretch.

The bed 32 is urged into operative position, with the sensing roll 48 against the paper roll 20, by means of a gas cylinder assembly 50. The gas cylinder 50 is secured to the crosspiece 17 and has the free end of its plunger 52 secured to a leg 36. Thus, the cylinder assembly 50 constantly urges the slidable bed 32 inwardly toward the paper roll 20 while permitting its in and out movement.

The differential surface contour of the paper roll 20 is detected by the sensing roll 48 which, in the course of its travel along the length of the paper roll is displaced inwardly or outwardly of a vertical plane positioned at the fixed reference distance depending upon the configuration of the roll. The movements of the sensing roll 48 are transferred to the bracket 40 and thus to the bed 32 which is caused to slide upon the rods 34.

The movements of the sensing roll 48 and connected parts are sensed by a transducer means best illustrated in FIG. 3. A transducer 54 is affixed to a leg 36 of the bed 32. A transducer rod 56, the movement of which controls the signal output of the transducer 54, projects from one end of the transducer.

The transducer rod 56 is slidably supported through the crosspiece 17. A pivotal locking bar 57, located upon the crospiece 17, is adapted to be urged into contact with the extended portion of the transducer rod 56 by a plunger 59. The locking bar 57 is adapted to lock the transducer rod 56 in position when urged into contact with the rod. Thus, it can be seen that movement of the sensing roll 48 and thus the bed 32 results in movement of the transducer 52 affixed to a leg 36. The transducer rod 56 being locked into position during operation results in a signal output from the transducer because of the relative movement between the transducer 54 and the transducer rod.

The signal yielded by the transducer 52 fluctuates in accordance with the variations in the surface contour of the roll which are represented by changes in the spacing between surface of the roll and the plane positioned at the fixed reference distance, these changes, in turn, being sensed by the sensing roll 48. The signal output is graphically recorded by suitable conventional means 53 connected to the transducer through the lead line 55. The recordation of the variations thus gives a graphic representation of the surface contour of the paper roll 20 in the form of a line which represents the high points and low points of the surface of the roll along the line of travel of the sensing roll 48.

Figure 7:
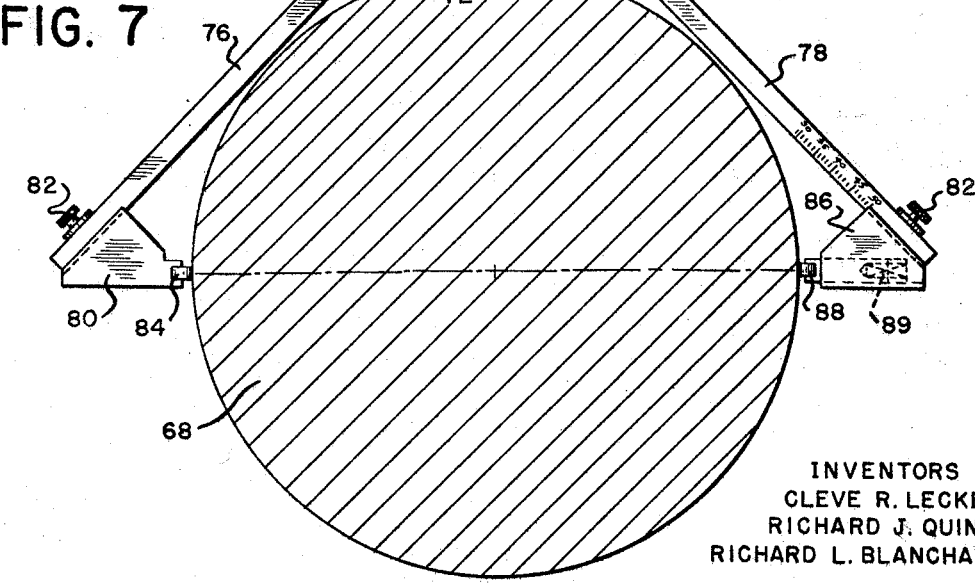
FIG. 7 is an end view of the embodiment of FIG. 6.

Another embodiment of the invention is illustrated in FIGS. 6 and 7. There, a carriage in the form of a saddle 60 is shown slidably mounted upon a support bar or shaft 62. The support bar 62 has attached thereto two branched support pads 64 and 66 which rest atop a paper roll 68. The branched pads 64 and 66 are identical and hold the support bar 62 in a position parallel to the longitudinal axis of the paper roll 68. As such, it will be seen that the pads themselves constitute a series of two or more pads which extend along a line parallel to the longitudinal axis of the paper roll. The saddle 60 has a cut-out portion 70 to permit the saddle to slide past the upright portions 72 and 74 of the branched pads 64 and 66. To aid in the slidability of the saddle 60, a ball bearing ring 63, suitably split to permit the passing of upright portions 72 and 74, is interposed between the saddle 60 and support bar 62. This arrangement of the saddle 60 upon support bar 62 also permits slight rocking movements of the device upon the support bar to facilitate its placement upon the paper roll.

The gauge arms or brackets 76 and 78 are disposed such that they straddle the paper roll 68 when the apparatus is in operative position. At the lower end of gauge arm 76, a guide 80 is located. The guide 80 is slidable along the gauge arm 76 and is held at various positions therealong by a set-screw 82. Disposed inwardly of the gauge arm 76 and upon guide 80 is a guide follower 84. Guide 80 is set so that the guide follower 84 is in rolling contact with paper roll 68 during operation.

At the lower end of gauge arm 78, a sensor 86 is located. Sensor 86 is slidable along the gauge arm 78 and is held in various positions therealong by the set-screw 82. In this embodiment the sensor 86 holds a spring loaded follower 88 which is urged outwardly thereof by spring 89. The spring means, while unitary with the sensing means, thus serves to urge the carriage 60 rotatably about the support bar 62 and continuously holds the guide follower 84 in engagement with the surface of the roll. As shown in FIG. 6, a transducer 90, for example, a linear variable differential transformer 90, the output signal of which is recorded or charted is fixed to the sensor 86 and provided with a slidable transducer rod 92 which is in turn connected to the follower 88. Variations in the transducer signal are caused by fluctuations in the position of the follower 88 within the sensor 86 with such movements in turn causing relative movement of the transducer rod within the transducer as the device is moved parallel to the longitudinal axis of the roll 68 and the vertical axis extending through such axis.

The purpose of the set-screws 82 is to permit the guide 80 and sensor 86 to be set into position upon an element of paper rolls of varying sizes. To aid in this adjustment, markings are made upon the gauge arms.

Movement of the carriage along the support bar 62 is preferably by means of a wire 90' attached to the carriage. The wire 90' runs over a pulley 92' driven by motor 94. The motor 94 is driven at a speed to move the carriage 60 along the support bar 62 at a rate synchronous with the recording device. The motor 94 is preferably mounted upon the support bar 62. Accuracy of the device is increased by the presence of the motor 94 which provides a smooth and continuous travel of the carriage 60. A reversing switch 96 is also mounted upon the support bar 62 to limit the travel of the carriage 60.

The apparatus of the present invention is operated as follows. The paper roll to be examined is placed in position. The carriage is then positioned upon or adjacent to the roll depending upon the embodiment used. The sensing roll is positioned against the paper roll and adjusted.

The motor is then turned on causing the carriage to move along the support bar or shaft. As the carriage moves parallel to the longitudinal axis of the paper roll or to the vertical plane extending through such axis, the transducer responds to variations in the roll's surface contour by reason of the rolling contact of the sensing roll with the paper roll. The transducer continuously emits a signal in accordance with the variations on the surface of the paper roll and the signals are translated into a visual pattern upon chart paper of a recording machine, thereby giving a continuous picture of the surface contour variations in the paper roll along its entire length and as a direct result a graphic representation or measurement of the differential stretch in the paper web.

The visual pattern on the chart paper is produced in the well-known manner by a movable stylus marking fluctuations on a moving chart. Ideally, a perfect roll of web would be one in which the roll surface contour would have no variations and accordingly, a straight line would appear upon the chart. A less than perfect roll would produce undulations in the line representing bulges or concavities in the roll.

The signals are graphically recorded to indicate the departure of the roll surface contour from a norm as may be represented by the reference distance which then gives the basis for a judgment as to the condition or acceptability of entire length of web.

The measuring apparatus described thus functions for obtaining measurements of differential web caliper or stretch in a wound supply of such material and these measurements are valuable when compared with a standard which has been found to be acceptable with the particular web using apparatus to be used.

The above description has been made with respect to two particular embodiments of the present invention; however, it is to be understood that various changes can be made without departing from the scope of the invention.

We claim:
1. An apparatus for measuring the differential stretch in a web of material wound into a roll about a predetermined axis comprising:
   (a) a series of branched support pads resting at spaced points on the surface of said roll, said series extending along a line parallel to said predetermined axis;
   (b) an elongated cylindrical support bar fixed to said support pads and extending in a direction parallel to said line;
   (c) a carriage slidably and rotatably mounted on said support bar;
   (d) means for mounting said carriage for movement along said support bar;
   (e) a pair of gauge arms fixed to said carriage and extending on opposite sides of said roll in a plane perpendicular to said line;
   (f) a guide follower fixed to one of said arms and engaging the surface of said roll;
   (g) sensing means fixed to the other of said arms and engaging the surface of said roll at a point diametrically opposite said guide follower for sensing the differential surface contour of said wound roll of web as said carriage moves along said support bar;
   (h) means urging said carriage rotatively about said support bar for continuously holding said guide follower in engagement with the surface of said roll;
   (i) recording means for continuously recording the output signal of said sensing means; and
   (j) means for moving said carriage along said support bar at a rate synchronous with the recording means.
2. An apparatus for measuring the differential stretch in a web of material wound into a roll about a predetermined axis as set forth in claim 1 wherein:
   (a) said urging means is unitary with said sensing means; and
   (b) said sensing means further includes a slidable follower urged toward the surface of said roll by said spring means.

References Cited
UNITED STATES PATENTS

| 1,845,199 | 2/1932 | Schnuck | 33—178 X |
| 3,237,312 | 3/1966 | Boppel | 33—174 X |

FOREIGN PATENTS

| 554,338 | 7/1932 | Germany. | |

SAMUEL S. MATTHEWS, *Primary Examiner.*